United States Patent
Moshchuk et al.

(10) Patent No.: US 11,292,454 B2
(45) Date of Patent: Apr. 5, 2022

(54) APPARATUS AND METHOD THAT DETERMINE PARKING FEASIBILITY

(71) Applicant: GM GLOBAL TECHNOLOGY OPERATIONS LLC, Detroit, MI (US)

(72) Inventors: Nikolai K. Moshchuk, Grosse Pointe, MI (US); David Andres Pérez Chaparro, Ferndale, MI (US); Kausalya Singuru, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 256 days.

(21) Appl. No.: 16/576,110

(22) Filed: Sep. 19, 2019

(65) Prior Publication Data

US 2021/0086755 A1    Mar. 25, 2021

(51) Int. Cl.
| | |
|---|---|
| *B60W 30/06* | (2006.01) |
| *B60W 40/02* | (2006.01) |
| *B60L 15/20* | (2006.01) |
| *B60L 53/12* | (2019.01) |

(52) U.S. Cl.
CPC ............. *B60W 30/06* (2013.01); *B60L 15/20* (2013.01); *B60L 53/12* (2019.02); *B60W 40/02* (2013.01)

(58) Field of Classification Search
CPC ....... B60W 30/06; B60W 40/02; B60L 53/12; B60L 15/20
See application file for complete search history.

(56) References Cited

U.S. PATENT DOCUMENTS

| | | | | |
|---|---|---|---|---|
| 9,969,386 | B1* | 5/2018 | Wang | B60W 30/06 |
| 2008/0208454 | A1* | 8/2008 | Pesterev | G01C 21/16 |
| | | | | 701/467 |
| 2010/0076640 | A1* | 3/2010 | Maekawa | G05D 1/0217 |
| | | | | 701/26 |
| 2016/0075329 | A1* | 3/2016 | Tomozawa | B62D 15/0285 |
| | | | | 701/41 |
| 2016/0311465 | A1* | 10/2016 | Friend | G01B 7/30 |
| 2017/0144702 | A1* | 5/2017 | Dang | A01B 69/008 |
| 2017/0202131 | A1* | 7/2017 | Bunderson | A01B 79/005 |
| 2018/0257688 | A1* | 9/2018 | Carter | B62B 3/1404 |
| 2018/0359904 | A1* | 12/2018 | Foster | G05D 1/0223 |

(Continued)

FOREIGN PATENT DOCUMENTS

JP        2008201177 A    *    9/2008

OTHER PUBLICATIONS

Endo, Tomohiko et al.; English Translation of JP2008201177A, "Parking Assist Device"; Sep. 4, 2008; Espacenet (EPO) (Year: 2008).*

*Primary Examiner* — Fadey S. Jabr
*Assistant Examiner* — Naeem Taslim Alam
(74) *Attorney, Agent, or Firm* — Cantor Colburn LLP

(57) ABSTRACT

A method and apparatus that determine parking feasibility are provided. The method includes determining a charging pad location based on information received from sensors or the charging pad, generating a path function corresponding to a path from a vehicle position to the charging pad location, determining whether a vehicle is within a parking maneuver feasibility region by comparing values of the generated path function, a minimum turning radius of the vehicle, and a maximum steering angle rate of the vehicle, and moving the vehicle to the charging pad location if the vehicle is in the parking maneuver feasibility region.

19 Claims, 3 Drawing Sheets

(56) References Cited

U.S. PATENT DOCUMENTS

| | | |
|---|---|---|
| 2020/0070666 A1* | 3/2020 | Sankaran ................ B60L 53/39 |
| 2020/0175252 A1* | 6/2020 | Gusikhin ................ G01C 21/34 |
| 2020/0180606 A1* | 6/2020 | Bensemann ......... G05D 1/0212 |
| 2020/0307403 A1* | 10/2020 | Rastoll ................. G05D 1/0246 |
| 2021/0008999 A1* | 1/2021 | Rodriguez Romero ..................... B60L 53/36 |
| 2021/0056848 A1* | 2/2021 | Tsuge ................. G06K 9/00798 |
| 2021/0081624 A1* | 3/2021 | Kovarik ............ G06K 7/10376 |
| 2021/0217310 A1* | 7/2021 | Ikoma ................ G01C 21/3407 |

\* cited by examiner

APPARATUS AND METHOD THAT DETERMINE PARKING FEASIBILITY

INTRODUCTION

Apparatuses and methods consistent with exemplary embodiments relate to automated parking of a vehicle. More particularly, apparatuses consistent with exemplary embodiments relate to automated parking at a charging station.

SUMMARY

One or more exemplary embodiments provide an apparatus capable of determining whether a vehicle can maneuver to a parking spot from a its current position. More particularly, one or more exemplary embodiments provide an apparatus that can determine whether a vehicle can maneuver to a charging spot from its current position based on whether the vehicle is in a parking feasibility region.

According to an aspect of an exemplary embodiment, a method of determining parking feasibility is provided. The method includes: determining a charging pad location based on information received from sensors or the charging pad, generating a path function corresponding to a path from a vehicle position to the charging pad location, determining whether a vehicle is within a parking maneuver feasibility region by comparing values of the generated path function, a minimum turning radius of the vehicle, and a maximum steering angle rate of the vehicle, and moving the vehicle to the charging pad location if the vehicle is in the parking maneuver feasibility region.

The method may also include moving the vehicle to the parking feasibility region if the vehicle is outside of the parking maneuver feasibility region.

The generating the path function may include using a parametric function based on one or more of cubic B-splines, Dubins path, and two circular arcs.

The determining whether the vehicle is within the parking maneuver feasibility region may include determining a maximum vehicle curvature value of a vehicle curvature function based on the minimum turning radius of the vehicle and a longitudinal distance between a point of interest in the vehicle and the rear axle of the vehicle, determining a maximum value of a time derivative of the vehicle curvature function based on the maximum steering angle rate of the vehicle, a wheelbase of the vehicle, the longitudinal distance between a point of interest in the vehicle and the rear axle of the vehicle, and the minimum turning radius of the vehicle, determining a maximum curvature value for the generated path function, determining a time derivative of the generated path function and a maximum value of the time derivative of the generated path function if the vehicle is to follow the generated path at a constant speed, comparing an absolute value of the maximum value of the time derivative of the generated path function to the maximum value of the time derivative of the vehicle curvature function, comparing an absolute value of the maximum value of the curvature of the generated path function to the maximum vehicle curvature value of the vehicle curvature function, and determining that the vehicle is in the parking maneuver feasibility region if the absolute value of the maximum value of the time derivative of the generated path function is less than to the maximum value of the time derivative of the vehicle curvature function and if the absolute value of the maximum value of the curvature of the generated path function is less than the maximum vehicle curvature value of the vehicle curvature function.

The determining whether the vehicle is within the parking maneuver feasibility region may further include multiplying the absolute value of the maximum value of the time derivative of the curvature of the generated path function and the absolute value of the maximum value of the curvature of the generated path function by a comfort constant.

The vehicle curvature function is $$K_{max\_Veh} = \frac{1}{R\sqrt{1 + b^2/R^2}},$$

where R corresponds to the minimum turning radius of the vehicle, and b corresponds to the and a longitudinal distance between a point of interest in the vehicle and the rear axle of the vehicle.

The maximum value of the time derivative of the vehicle curvature function may be determined according to the function $$\dot{k}_{max\_Veh} = \frac{\dot{\delta}_{max\_Veh}(1 + L^2/R^2)}{L(1 + b^2/R^2)^{3/2}},$$

where $\dot{\delta}_{max\_Veh}$ corresponds to the maximum steering angle rate of the vehicle, L corresponds to a wheelbase of the vehicle, R corresponds to the minimum turning radius of the vehicle, and b corresponds to the longitudinal distance between a point of interest in the vehicle and the rear axle of the vehicle.

The maximum curvature value of the generated path function may be determined from the function, $$\kappa = \frac{X'X'' + Y'Y''}{\sigma^3},$$

where X and Y are parametric functions describing the generated path function and $$\sigma = \sqrt[2]{X' + Y'},$$

and the maximum value of the time derivative of the generated path function may be $$\dot{k}_{max} = \max\left(\frac{d\kappa}{ds}\right)V_c, \text{ where } \frac{d\kappa}{ds} = \frac{|X'Y''' - Y'X'''| - 3\sigma^2\sigma'\kappa}{\sigma^4}$$

where $V_c$ corresponds to a constant speed of vehicle travel to the charging pad location.

The method may further include providing a notification including one from among information about moving the vehicle to the parking maneuver feasibility region, information about a location of the parking maneuver feasibility region, and instructions on how to move the vehicle parking maneuver feasibility region.

According to an aspect of another exemplary embodiment, an apparatus that determines parking feasibility is provided. The apparatus includes at least one memory comprising computer executable instructions and at least one processor configured to read and execute the computer executable instructions. The computer executable instructions cause the at least one processor to determine a charging pad location based on information received from sensors or the charging pad, generate a path function corresponding to a path from a vehicle position to the charging pad location, determine whether a vehicle is within a parking maneuver feasibility region by analyzing values of the generated path function, a minimum turning radius of the vehicle, and a maximum steering angle rate of the vehicle, and move the vehicle to the charging pad location if the vehicle is in the parking maneuver feasibility region.

The computer executable instructions further cause the at least one processor to move the vehicle to the parking feasibility region if the vehicle is not within the parking maneuver feasibility region.

The computer executable instructions may further cause the at least one processor to generate the path function using a parametric function based on one or more of cubic B-splines, Dubins path, and two circular arcs.

The computer executable instructions may further cause the at least one processor to determine whether the vehicle is within the parking maneuver feasibility region by determining a maximum vehicle curvature value of a vehicle curvature function based on the minimum turning radius of the vehicle and a longitudinal distance between a point of interest in the vehicle and the rear axle of the vehicle, determining a maximum value of a time derivative of the vehicle curvature function based on the maximum steering angle rate of the vehicle, a wheelbase of the vehicle, the longitudinal distance between a point of interest in the vehicle and the rear axle of the vehicle, and the minimum turning radius of the vehicle, determining a maximum curvature value for the generated path function, determining a time derivative of the generated path function and a maximum value of the time derivative of the generated path function if the vehicle is to follow the generated path at a constant speed, comparing an absolute value of the maximum value of the time derivative of the generated path function to the maximum value of the time derivative of the vehicle curvature function, and comparing an absolute value of the maximum value of the curvature of the generated path function to the maximum vehicle curvature value of the vehicle curvature function.

The computer executable instructions may further cause the at least one processor to determine whether the vehicle is within the parking maneuver feasibility region by multiplying the absolute value of the maximum value of the time derivative of the curvature of the generated path function and the absolute value of the maximum value of the curvature of the generated path function by a comfort constant.

The vehicle curvature function may $$be\ \kappa_{max\_Veh} = \frac{1}{R\sqrt{1+b^2/R^2}},$$

where R corresponds to the minimum turning radius of the vehicle, and b corresponds to the and a longitudinal distance between a point of interest in the vehicle and the rear axle of the vehicle.

The maximum value of the time derivative of the vehicle curvature function may be determined according to the function $$\dot{\kappa}_{max\_Veh} = \frac{\dot{\delta}_{max\_Veh}(1+L^2/R^2)}{L(1+b^2/R^2)^{3/2}},$$

where $\dot{\delta}_{max\_Veh}$ corresponds to the maximum steering angle rate of the vehicle, L corresponds to a wheelbase of the vehicle, R corresponds to the minimum turning radius of the vehicle, and b corresponds to the longitudinal distance between a point of interest in the vehicle and the rear axle of the vehicle.

The maximum curvature value of the generated path function may be determined from the function, $$\kappa = \frac{X'X'' + Y'Y''}{\sigma^3},$$

where X and Y are parametric functions describing the generated path function and $$\sigma = \sqrt[2]{X' + Y'},$$

and the maximum value of the time derivative of the generated path function may be $$\dot{\kappa}_{max} = \max\left(\frac{d\kappa}{ds}\right)V_c, \text{ where } \frac{d\kappa}{ds} = \frac{|X'Y''' - Y'X'''| - 3\sigma^2\sigma'\kappa}{\sigma^4}$$

where $V_c$ corresponds to a constant speed of vehicle travel to the charging pad location.

The computer executable instructions may further cause the at least one processor to provide a notification including one from among: information about moving the vehicle to the parking maneuver feasibility region, information about a location of the parking maneuver feasibility region, and instructions on how to move the vehicle parking maneuver feasibility region.

The computer executable instructions may further cause the at least one processor to move the vehicle to the charging pad location if the vehicle is in the parking maneuver feasibility region by setting waypoints that the vehicle will follow to the charging pad.

Other objects, advantages and novel features of the exemplary embodiments will become more apparent from the following detailed description of exemplary embodiments and the accompanying drawings.

DETAILED DESCRIPTION

Figure 1:
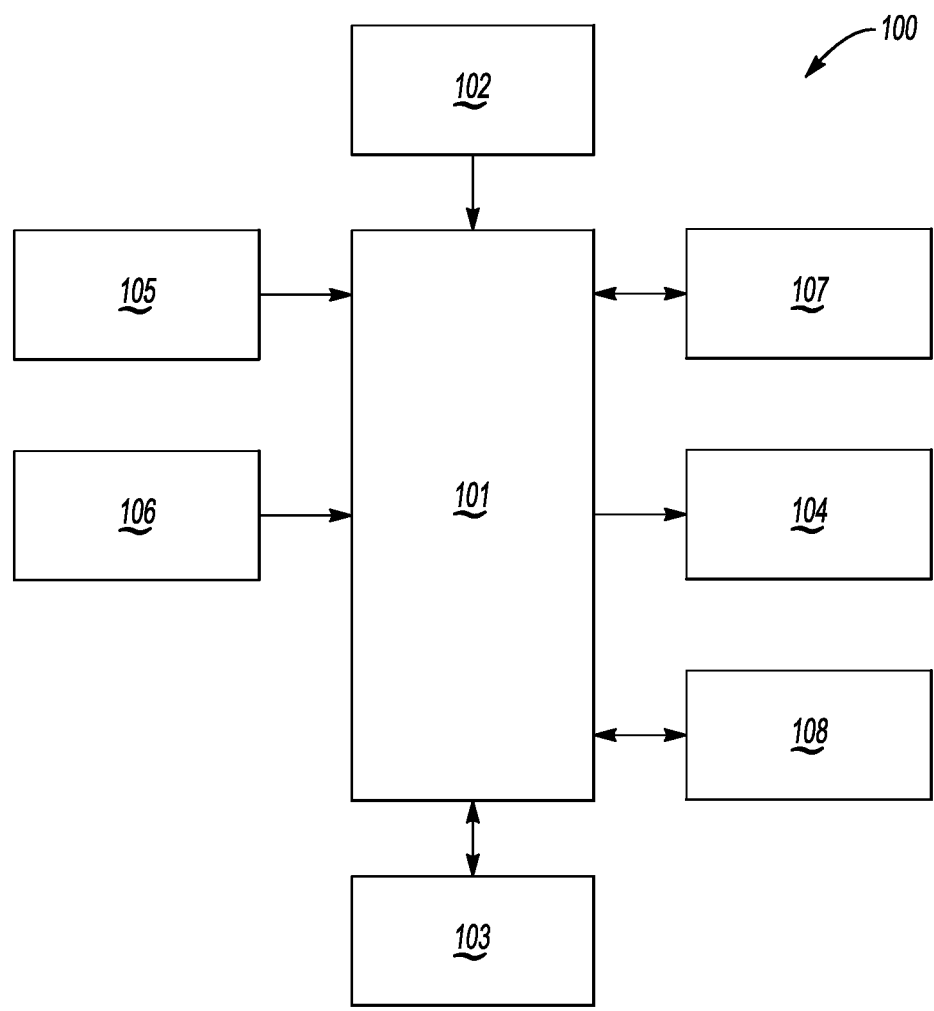
FIG. 1 shows a block diagram of an apparatus that determines parking feasibility according to an exemplary embodiment.

A method and apparatus that determine parking feasibility will now be described in detail with reference to FIGS. 1-3B of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "formed on," or "disposed on" a second element, the first element may be connected directly to, formed directly on or disposed directly on the second element or there may be intervening elements between the first element and the second element, unless it is stated that a first element is "directly" connected to, formed on, or disposed on the second element. In addition, if a first element is configured to "receive" information from a second element, the first element may receive the information directly from the second element, receive the information via a bus, receive the information via a network, or receive the information via intermediate elements, unless the first element is indicated to receive information "directly" from the second element.

Throughout the disclosure, one or more of the elements disclosed may be combined into a single device or combined into one or more devices. In addition, individual elements may be provided on separate devices.

Vehicles such as trucks may include automated guidance and control systems that may be used by an operator to move or control the vehicle. Moreover, as guidance and control systems become more advanced, vehicles may become fully automated and have the ability of guiding and controlling themselves from one location to another. One example of automated guidance that may assist a driver of a vehicle or that is required for fully autonomous electric vehicles is guiding a vehicle to a charging pad location. In this example, precision positioning for maximum charging efficiency as well as efficiency and quickness in executing the parking maneuver are helpful.

One prerequisite for precision positioning and maneuvering is to determine a parking maneuver feasibility region based on the locations of the charging pad, the vehicle and vehicle information. By determining the parking maneuver feasibility region, an automated vehicle may be able to park at the precise location or reposition itself to park at the precise location required to charge the vehicle efficiently.

FIG. 1 shows a block diagram of an apparatus that determines parking feasibility 100 according to an exemplary embodiment. As shown in FIG. 1, the apparatus that determines parking feasibility 100, according to an exemplary embodiment, includes a controller 101, a power supply 102, a storage 103, an output 104, a sensor 105, a user input 106, vehicle controls 107, and a communication device 108. However, the apparatus that determines parking feasibility 100 is not limited to the aforementioned configuration and may be configured to include additional elements and/or or omit one or more of the aforementioned elements.

The controller 101 controls the overall operation and function of the apparatus that determines parking feasibility 100. The controller 101 may control one or more of the storage 103, the output 104, the sensor 105, the user input 106, the vehicle controls 107, and the communication device 108 of the apparatus that determines parking feasibility 100. The controller 101 may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components.

The power supply 102 provides power to one or more of the storage 103, the output 104, the sensor 105, the user input 106, the vehicle controls 107, and the communication device 108 of the apparatus that determines parking feasibility 100. The power supply 102 may include one or more from a battery, an outlet, a capacitor, a solar energy cell, a generator, a wind energy device, an alternator, etc.

The storage 103 is configured to store information and for retrieving information used by the apparatus that determines parking feasibility 100. The storage 103 may be controlled by the controller 101 to store and retrieve vehicle information, charging pad information, etc. The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The vehicle information may include information about a status of a vehicle control, vehicle component, vehicle power state, etc. The vehicle information may be provided by sensors or devices such as one or more from among a Global Positioning System (GPS) device, a camera system, a speedometer, an odometer, an engine sensor, an emission sensor, a transmission sensor, a tire pressure sensor, a door sensor, a trunk sensor, a window sensor, an interior/exterior temperature sensor, a barometric pressure sensor, an acceleration sensor, a gyroscopic sensor, a touch force or pressure sensor, a seat sensor, a passenger sensor, a collision sensor, an external object detector, an ultrasonic sensor, a radar sensor, a thermometer, an altimeter, an electronic control unit (e.g., an electronic controller, etc.), a car light activation sensor, an ambient light sensor, a car key sensor, a car information and entertainment device (i.e., an infotainment device), a communication device, etc.

The vehicle information may include information on one or more from among an event associated with a vehicle, steering of a vehicle, a minimum turning radius of a vehicle, a maximum steering angle rate of the vehicle, a wheelbase of a vehicle, dimensions of a vehicle, an offset to a position of the charging assembly with respect to the vehicle, a turn indicator status, a speed of a vehicle, a predetermined constant speed of a vehicle, a location of a vehicle, an engine event or status, emission status, revolutions per minute of an engine, transmission status, tire pressure, door open/close status, trunk open/close status, window open/close status, interior/exterior temperature, barometric pressure, altitude of a vehicle, acceleration of a vehicle, user input, user applied pressure to an object or button in a vehicle, whether a passenger is in a seat, location or speed of external objects around the vehicle, which lights of a vehicle are activated, whether a car key is present in a vehicle, a currently displayed screen on a display in a vehicle, daytime or night time status, an amount of ambient light, a status of a vehicle, a status of a setting of a vehicle, and a location of a function that is executable by the user.

The output 104 outputs information in a visual, audible or haptic form or outputs a signal to cause another device to output information in the aforementioned forms. The output 104 may be controlled by the controller 101 to provide outputs to the user of the apparatus that determines parking feasibility 100. The output 104 may include one or more from among a speaker, a display, a heads up display, haptic feedback device, a vibration device, a tap-feedback device, a holographic display, etc.

The sensor 105 may include one or more from among a plurality of sensors including a camera, a laser sensor, an ultrasonic sensor, an infrared camera, a LIDAR, a radar sensor, an ultra-short range radar sensor, an ultra-wideband radar sensor, and a microwave sensor. The sensor 105 may be configured to scan an area around a vehicle to detect and provide imaging information including an image of the area around the vehicle. The sensor 105 may be used to compile imaging information or mapping information or data may including three-dimensional point cloud information. The sensor 105 may be configured to detect one or more from among a location of a parking spot, a location of a charging pad, a distance from a charging pad, a heading angle of the vehicle, an angle to a charging pad.

The user input 106 is configured to provide input information and commands to the apparatus that determines parking feasibility 100. The user input 106 may be used to provide user inputs, etc. to the controller 101. The user input 106 may include one or more from among a touchscreen, a keyboard, a soft keypad, a button, a motion detector, a voice input detector, a microphone, a camera, a trackpad, a mouse, a touchpad, etc.

The vehicle controls 107 may include vehicle system modules (VSMs) in the form of electronic hardware components that are located throughout the vehicle and typically receive input from one or more sensors and use the sensed input to perform diagnostic monitoring or control the vehicle to perform maneuvers, accelerate, brake, decelerate, report and/or other functions. Each of the VSMs may be connected by a communications bus to the other VSMs, as well as to the controller 101, and can be programmed to run vehicle system and subsystem diagnostic tests. The controller 101 may be configured to send and receive information from the VSMs and to control VSMs to perform vehicle functions.

As examples, one VSM can be an engine control module (ECM) that controls various aspects of engine operation such as fuel ignition and ignition timing, another VSM can be an external sensor module configured to receive information from sensors 105 such as cameras, radars, LIDARs, and lasers, another VSM can be a powertrain control module that regulates operation of one or more components of the vehicle powertrain, another VSM can be the vehicle dynamics sensor that detects an understeer gradient, vehicle cornering stiffness and suspension compliance, a steering wheel angle parameter, a speed parameter such as a vehicle forward velocity, an acceleration parameter or command, a lateral acceleration parameter, and/or a road wheel angle parameter, and another VSM can be a body control module that governs various electrical components located throughout the vehicle, like the vehicle's power door locks and headlights. As is appreciated by those skilled in the art, the above-mentioned VSMs are only examples of some of the modules that may be used in a vehicle, as numerous others are also available.

The communication device 108 may be used by apparatus that determines parking feasibility 100 to communicate with various types of external apparatuses according to various communication methods. The communication device 108 may be used to provide vehicle information, charging pad information, etc., to the controller 101 and the apparatus that determines parking feasibility 100.

The communication device 108 may include various communication modules such as a broadcast receiving module, a near field communication (NFC) module, a GPS module, and a wireless communication module. The broadcast receiving module may include a terrestrial broadcast receiving module including an antenna to receive a terrestrial broadcast signal, a demodulator, and an equalizer, and a digital multimedia broadcasting (DMB) module to receive and process a DMB broadcast signal. The NFC module is a module that communicates with an external apparatus located at a nearby distance according to an NFC method. The GPS module is a module that receives a GPS signal from a GPS satellite and detects a current location. The wireless communication module is a module that is connected to an external network by using a wireless communication protocol such as Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), 5G, Bluetooth, or ZigBee.

According to an exemplary embodiment, the controller 101 of the apparatus that determines parking feasibility 100 is configured to determine a charging pad location based on information received from sensors or the charging pad, generate a path function corresponding to a path from a vehicle position to the charging pad location, determine whether a vehicle is within a parking maneuver feasibility region by analyzing values of the generated path function, a minimum turning radius of the vehicle, and a maximum steering angle rate of the vehicle, and move the vehicle to the charging pad location if the vehicle is in the parking maneuver feasibility region.

The controller 101 may be configured to move the vehicle to the parking feasibility region if the vehicle is not within the parking maneuver feasibility region.

The controller 101 may be configured to generate the path function using a parametric function based on one or more of cubic B-splines, Dubins path, two circular arcs, or other additional methods.

The controller 101 may be configured to determine whether the vehicle is within the parking maneuver feasibility region by determining a maximum vehicle curvature value of a vehicle curvature function based on the minimum turning radius of the vehicle and a longitudinal distance between a point of interest in the vehicle and the rear axle of the vehicle, determining a maximum value of a time derivative of the vehicle curvature function based on the maximum steering angle rate of the vehicle, a wheelbase of the vehicle, the longitudinal distance between a point of interest in the vehicle and the rear axle of the vehicle, and the minimum turning radius of the vehicle, determining a maximum curvature value for the generated path function, determining a time derivative of the generated path function and a maximum value of the time derivative of the generated path function if the vehicle is to follow the generated path at a constant speed, comparing an absolute value of the maximum value of the time derivative of the generated path function to the maximum value of the time derivative of the vehicle curvature function, and comparing an absolute value of the maximum value of the curvature of the generated path function to the maximum vehicle curvature value of the vehicle curvature function.

The controller 101 may determine that the vehicle is in the parking maneuver feasibility region if the absolute value of the maximum value of the time derivative of the generated path function is less than to the maximum value of the time derivative of the vehicle curvature function and if the absolute value of the maximum value of the curvature of the generated path function is less than the maximum vehicle curvature value of the vehicle curvature function.

The controller 101 may further determine whether the vehicle is within the parking maneuver feasibility region by multiplying the absolute value of the maximum value of the time derivative of the curvature of the generated path function and the absolute value of the maximum value of the curvature of the generated path function by a comfort constant.

The vehicle curvature function may be $$\kappa_{max\_Veh} = \frac{1}{R\sqrt{1+b^2/R^2}},$$

where R corresponds to the minimum turning radius of the vehicle, and b corresponds to the and a longitudinal distance between a point of interest in the vehicle and the rear axle of the vehicle. The point of interest in the vehicle may be the vehicle charging assembly unit.

The maximum value of the time derivative of the vehicle curvature function may be determined according to the function $$\dot{\kappa}_{max\_Veh} = \frac{\dot{\delta}_{max\_Veh}(1+L^2/R^2)}{L(1+b^2/R^2)^{3/2}},$$

where $\dot{\delta}_{max\_Veh}$ corresponds to the maximum steering angle rate of the vehicle, L corresponds to a wheelbase of the vehicle, R corresponds to the minimum turning radius of the vehicle, and b corresponds to the longitudinal distance between a point of interest in the vehicle and the rear axle of the vehicle.

The maximum curvature value of the generated path function may be determined from the function, $$\kappa = \frac{X'+X''+Y'Y''}{\sigma^3},$$

where X and Y are parametric functions describing the generated path function and $$\sigma = \sqrt[2]{X'+Y'},$$

and the maximum value of the time derivative of the generated path function may be $$\dot{\kappa}_{max} = \max\left(\frac{d\kappa}{ds}\right)V_c, \text{ where } \frac{d\kappa}{ds} = \frac{|X'Y'''-Y'X'''|-3\sigma^2\sigma'\kappa}{\sigma^4}$$

where $V_c$ corresponds to a constant speed of vehicle travel to the charging pad location.

The controller 101 may be configured to provide a notification including one from among: information about moving the vehicle to parking maneuver feasibility region, information about a location of the parking maneuver feasibility region, and instructions on how to move the vehicle to the parking maneuver feasibility region.

The controller 101 may be configured to control to move the vehicle to the charging pad location if the vehicle is in the parking maneuver feasibility region by setting waypoints that the vehicle will follow to the charging pad.

Figure 2:
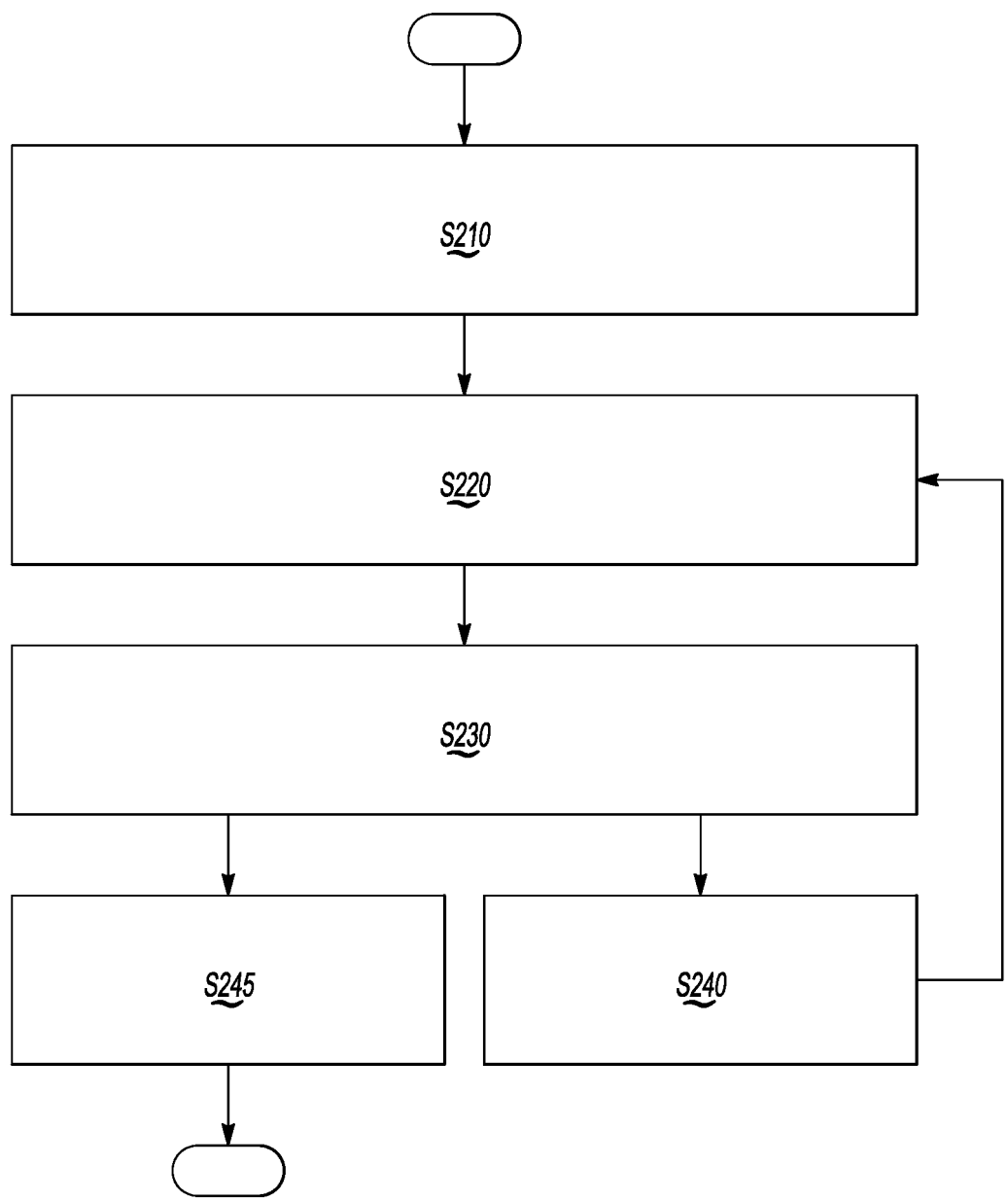
FIG. 2 shows a flowchart for a method of determining parking feasibility according to an exemplary embodiment.

FIG. 2 shows a flowchart for a method of determining parking feasibility according to an exemplary embodiment. The method of FIG. 2 may be performed by the apparatus that determines parking feasibility 100 or may encoded into a computer readable medium as instructions that are executable by a computer to perform the method.

Referring to FIG. 2, a charging pad location is determined from information received from sensors or the charging pad in operation S210. In operation S220, a path function corresponding to a path from a vehicle position to the charging pad location is generated.

In operation S230, it is determined whether a vehicle is within a parking maneuver feasibility region by comparing values of the generated path function, a minimum turning radius of the vehicle, and a maximum steering angle rate of the vehicle. If the vehicle is outside of or not within the parking maneuver feasibility region, the vehicle is moved to the parking feasibility region in operation S240 and the process reverts to operation S230. If the vehicle is in the parking maneuver feasibility region, the vehicle can perform the automated parking maneuver toward the charging pad S245.

Figure 3A:
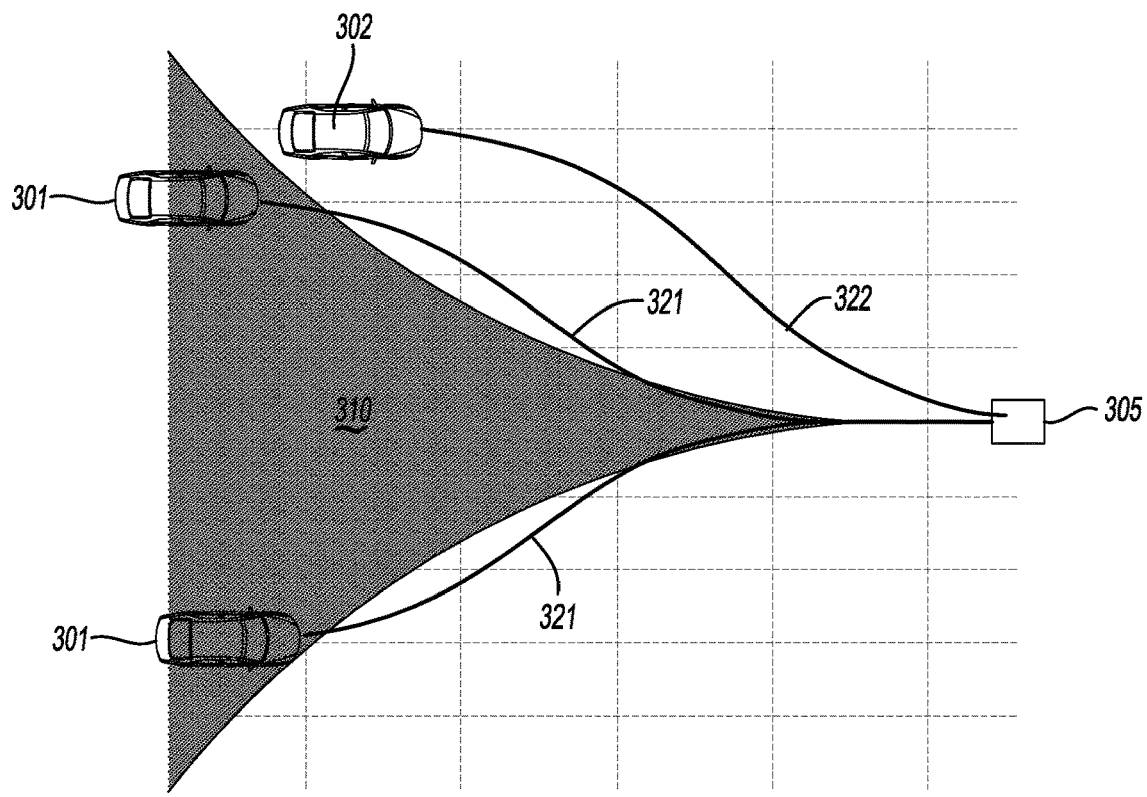
FIGS. 3A and 3B show example illustrations of a parking maneuver feasibility region according to an aspect of an exemplary embodiment.
Figure 3B:
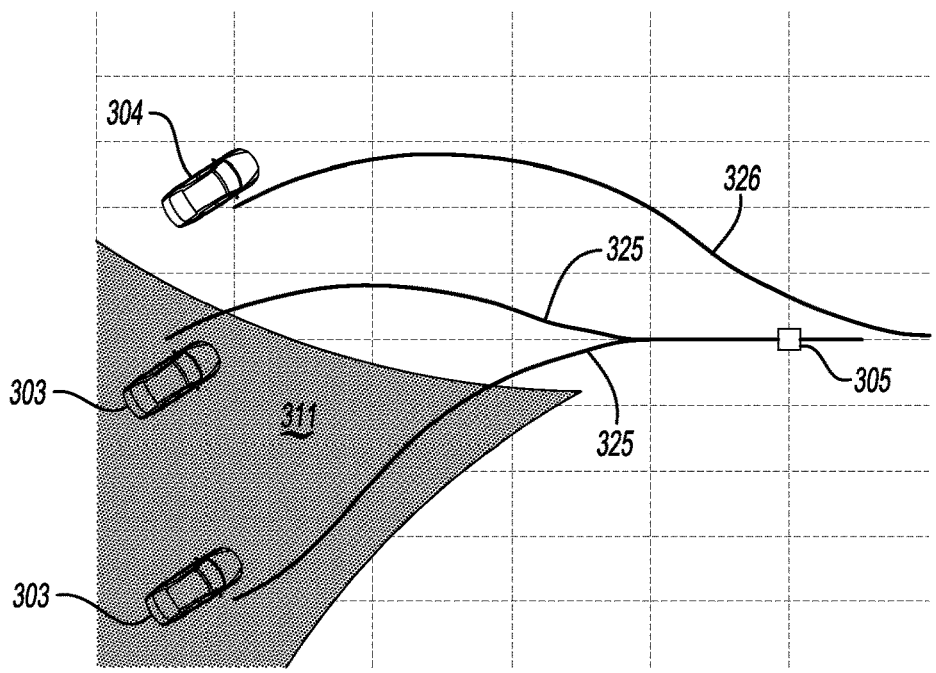

FIGS. 3A and 3B show example illustrations of a parking maneuver feasibility region according to an aspect of an exemplary embodiment. Referring to FIG. 3A, vehicles 301 are within the parking maneuver feasibility region 310, whereas vehicle 302 is outside of the parking maneuver feasibility region 310. As a result of vehicle 302 being outside of the parking maneuver feasibility region 310, vehicle 302 cannot reach the appropriate position on top of charging pad 305 the generated path 322 and/or cannot traverse the generated path 322. However, as vehicles 301 are the parking maneuver feasibility region 310, the vehicles 301 may reach the appropriate position on top of charging pad 305 using generated paths 321, respectively.

Referring to FIG. 3B, the illustration is similar to FIG. 3A except that the orientation, heading angle or initial heading of vehicles 303 and 304 is considered when determining the parking maneuver feasibility region 311 and paths 325, 326 of vehicles 303, 304. For example, the curves defining the parking maneuver feasibility region 311 will shift and change in shape depending on the heading of the vehicles 303, 304 with respect to the charging pad 305.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method of determining parking feasibility, the method comprising:
   determining a charging pad location based on information received from sensors or the charging pad;
   generating a path function corresponding to a generated path from a vehicle position to the charging pad location;
   determining whether a vehicle is within a parking maneuver feasibility region by comparing values of the generated path function, a minimum turning radius of the vehicle, and a maximum steering angle rate of the vehicle, wherein determining that the vehicle is within the parking maneuver feasibility region comprises:
   computing a maximum vehicle curvature value of a vehicle curvature function based on the minimum turning radius of the vehicle and a longitudinal distance between a point of interest in the vehicle and the rear axle of the vehicle;
   computing a maximum value of a time derivative of the vehicle curvature function based on the maximum steering angle rate of the vehicle, a wheelbase of the vehicle, the longitudinal distance between a point of interest in the vehicle and the rear axle of the vehicle, and the minimum turning radius of the vehicle;
   computing a maximum curvature value for the generated path function;
   computing a time derivative of the generated path function and a maximum value of the time derivative of the generated path function if the vehicle is to follow the generated path at a constant speed; and
   determining that an absolute value of the maximum value of the time derivative of the generated path function is less than the maximum value of the time derivative of the vehicle curvature function and that an absolute value of the maximum value of a curvature of the generated path function is less than the maximum vehicle curvature value of the vehicle curvature function; and
   moving the vehicle to the charging pad location if the vehicle is in the parking maneuver feasibility region.

2. The method of claim 1, further comprising moving the vehicle to the parking maneuver feasibility region if the vehicle is outside of the parking maneuver feasibility region.

3. The method of claim 1, wherein the generating the path function comprises using a parametric function based on one or more of cubic B-splines, Dubins path, and two circular arcs.

4. The method of claim 1, wherein the determining whether the vehicle is within the parking maneuver feasibility region further comprises multiplying the absolute value of the maximum value of the time derivative of the curvature of the generated path function and the absolute value of the maximum value of the curvature of the generated path function by a comfort constant.

5. The method of claim 1, wherein the vehicle curvature function is $$\kappa_{max\_Veh} = \frac{1}{R\sqrt{1+b^2/R^2}},$$

where R corresponds to the minimum turning radius of the vehicle, and b corresponds to the longitudinal distance between the point of interest in the vehicle and the rear axle of the vehicle.

6. The method of claim 1, wherein the maximum value of the time derivative of the vehicle curvature function is determined according to a function $$\dot{\kappa}_{max\_Veh} = \frac{\delta_{max\_Veh}(1+L^2/R^2)}{L(1+b^2/R^2)^{3/2}},$$

where $\dot{\delta}_{max\_Veh}$ corresponds to the maximum steering angle rate of the vehicle, L corresponds to a wheelbase of the vehicle, R corresponds to the minimum turning radius of the vehicle, and b corresponds to the longitudinal distance between the point of interest in the vehicle and the rear axle of the vehicle.

7. The method of claim 1, wherein the maximum curvature value of the generated path function is determined from a function $$\kappa = \frac{X'+X''+Y'Y''}{\sigma^3},$$

where X and Y are parametric functions describing the generated path function and $$\sigma = \sqrt[2]{X'+Y'},$$

and
   wherein the maximum value of the time derivative of the generated path function is $$\dot{\kappa}_{max} = \max\left(\frac{d\kappa}{ds}\right)V_c, \text{ where } \frac{d\kappa}{ds} = \frac{|X'Y'''-Y'X'''|-3\sigma^2\sigma'\kappa}{\sigma^4}$$

where $V_c$ corresponds to the constant speed of vehicle travel to the charging pad location.

8. The method of claim 1, further comprising providing a notification including one from among: information about moving the vehicle to the parking maneuver feasibility region, information about a location of the parking maneuver feasibility region, and instructions on how to move the vehicle to the parking maneuver feasibility region.

9. A non-transitory computer readable medium comprising instructions executable by a computer to perform a method comprising:
   determining a charging pad location based on information received from sensors or the charging pad;
   generating a path function corresponding to a path from a vehicle position to the charging pad location;
   determining that a vehicle is within a parking maneuver feasibility region based on a determination that an absolute value of a maximum value of a time derivative of the generated path function is less than a maximum value of a time derivative of a vehicle curvature function and that an absolute value of a maximum value of a curvature of the generated path function is less than a maximum vehicle curvature value of the vehicle curvature function; and moving the vehicle to the charging pad location if the vehicle is in the parking maneuver feasibility region.

10. An apparatus that determines parking feasibility, the apparatus comprising:
at least one memory comprising computer executable instructions; and
at least one processor configured to read and execute the computer executable instructions, the computer executable instructions causing the at least one processor to:
determine a charging pad location based on information received from sensors or the charging pad;
generate a path function corresponding to a generated path from a vehicle position to the charging pad location;
determine a maximum vehicle curvature value of a vehicle curvature function based on a minimum turning radius of the vehicle and a longitudinal distance between a point of interest in the vehicle and a rear axle of the vehicle;
determine whether a vehicle is within a parking maneuver feasibility region based on a determination that an absolute value of a maximum value of a time derivative of the generated path function is less than a maximum value of a time derivative of a vehicle curvature function and that an absolute value of a maximum value of a curvature of the generated path function is less than a maximum vehicle curvature value of the vehicle curvature function; and
move the vehicle to the charging pad location if the vehicle is in the parking maneuver feasibility region.

11. The apparatus of claim 10, wherein the computer executable instructions further cause the at least one processor to move the vehicle to the parking maneuver feasibility region if the vehicle is not within the parking maneuver feasibility region.

12. The apparatus of claim 11, wherein the computer executable instructions further cause the at least one processor to generate the path function using a parametric function based on one or more of cubic B-splines, Dubins path, and two circular arcs.

13. The apparatus of claim 10, wherein the computer executable instructions further cause the at least one processor to determine whether the vehicle is within the parking maneuver feasibility region by:
determining the maximum value of a time derivative of the vehicle curvature function based on the maximum steering angle rate of the vehicle, a wheelbase of the vehicle, the longitudinal distance between the point of interest in the vehicle and the rear axle of the vehicle, and the minimum turning radius of the vehicle;
determining the maximum curvature value for the generated path function; and
determining the time derivative of the generated path function and the maximum value of the time derivative of the generated path function if the vehicle is to follow the generated path at a constant speed.

14. The apparatus of claim 10, wherein the computer executable instructions further cause the at least one processor to determine whether the vehicle is within the parking maneuver feasibility region by multiplying the absolute value of the maximum value of the time derivative of the curvature of the generated path function and the absolute value of the maximum value of the curvature of the generated path function by a comfort constant.

15. The apparatus of claim 13, wherein the vehicle curvature function is $$k_{max\_Veh} = \frac{1}{R\sqrt{1+b^2/R^2}},$$

where R corresponds to the minimum turning radius of the vehicle, and b corresponds to the and a longitudinal distance between the point of interest in the vehicle and the rear axle of the vehicle.

16. The apparatus of claim 13, wherein the maximum value of the time derivative of the vehicle curvature function is determined according to a function $$\dot{k}_{max\_Veh} = \frac{\dot{\delta}_{max\_Veh}(1+L^2/R^2)}{L(1+b^2/R^2)^{3/2}},$$

where $\dot{\delta}_{max\ Veh}$ corresponds to the maximum steering angle rate of the vehicle, L corresponds to a wheelbase of the vehicle, R corresponds to the minimum turning radius of the vehicle, and b corresponds to the longitudinal distance between the point of interest in the vehicle and the rear axle of the vehicle.

17. The apparatus of claim 13, wherein the maximum curvature value of the generated path function is determined from a function $$\kappa = \frac{X'+X''+Y'Y''}{\sigma^3},$$

where X and Y are parametric functions describing the generated path function and $$\sigma = \sqrt[2]{X'+Y'},$$

and
wherein the maximum value of the time derivative of the generated path function is $$\dot{k}_{max} = \max\left(\frac{d\kappa}{ds}\right)V_c, \text{ where } \frac{d\kappa}{ds} = \frac{|X'Y'''-Y'X'''|-3\sigma^2\sigma'\kappa}{\sigma^4}$$

where $V_c$ corresponds to a constant speed of vehicle travel to the charging pad location.

18. The apparatus of claim 10, wherein the computer executable instructions further cause the at least one processor to provide a notification including one from among: information about moving the vehicle to the parking maneuver feasibility region, information about a location of the parking maneuver feasibility region, and instructions on how to move the vehicle to the parking maneuver feasibility region.

19. The apparatus of claim 10, wherein the computer executable instructions further cause the at least one processor to move the vehicle to the charging pad location if the vehicle is in the parking maneuver feasibility region by setting waypoints that the vehicle will follow to the charging pad.

* * * * *